Feb. 25, 1941.   R. H. KRESS   2,232,790
CONTROL ASSEMBLY FOR AUTOMOBILES
Filed July 31, 1936    2 Sheets-Sheet 1
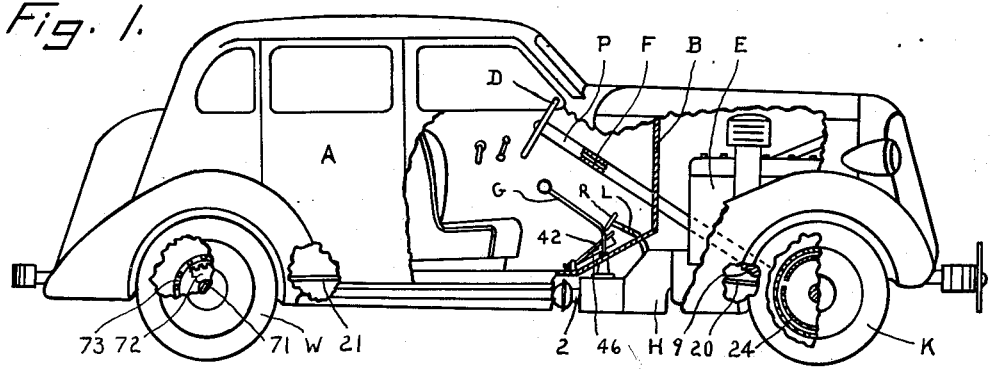
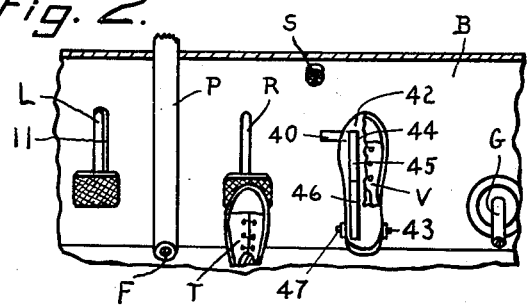
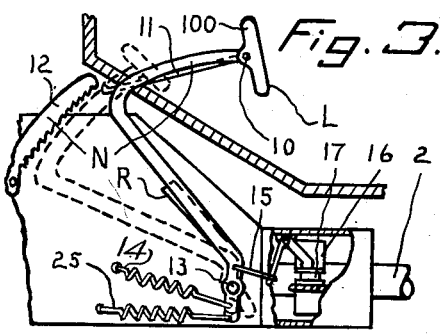
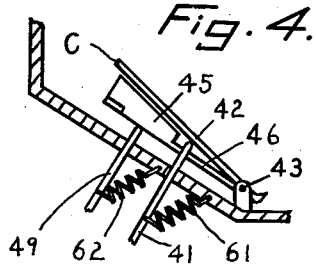
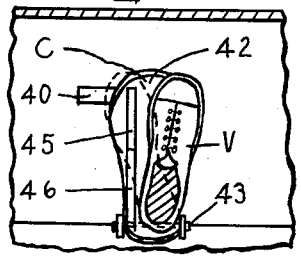
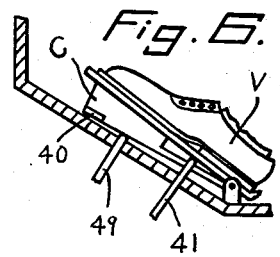
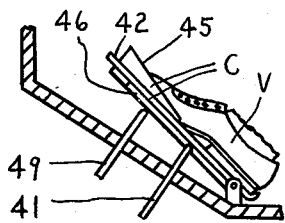
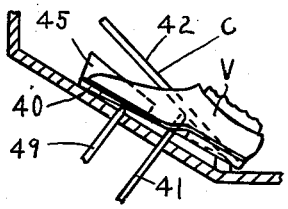
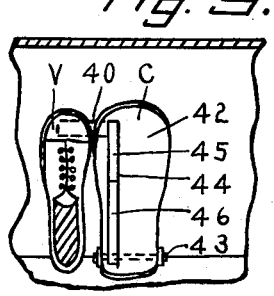
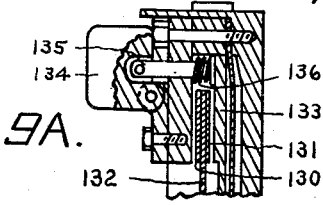
INVENTOR
Ralph H. Kress
BY Gardner W. Barson
ATTORNEY Feb. 25, 1941.  R. H. KRESS  2,232,790
CONTROL ASSEMBLY FOR AUTOMOBILES
Filed July 31, 1936   2 Sheets-Sheet 2
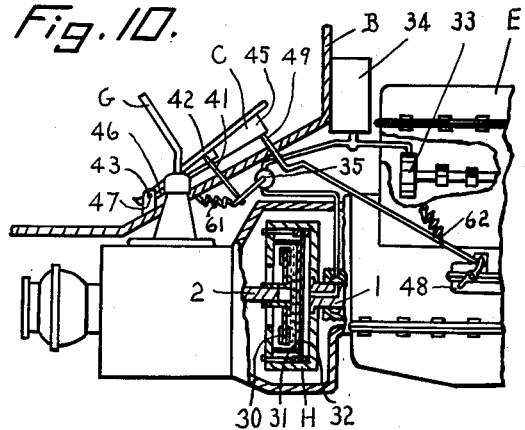
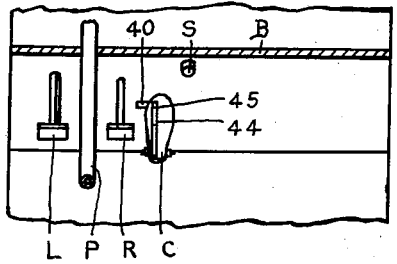
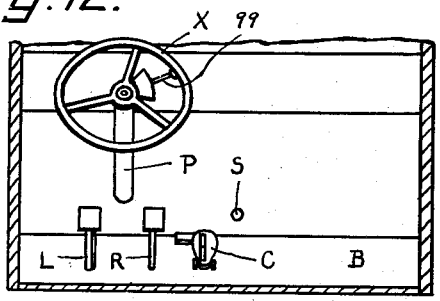
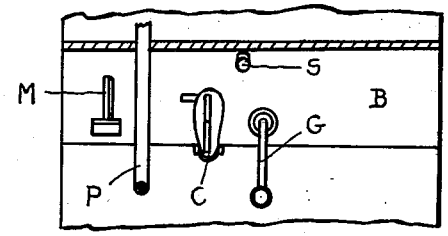
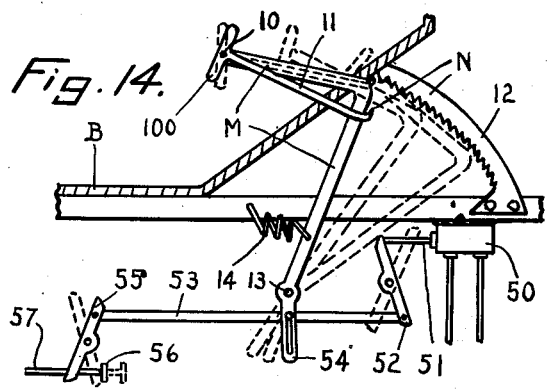
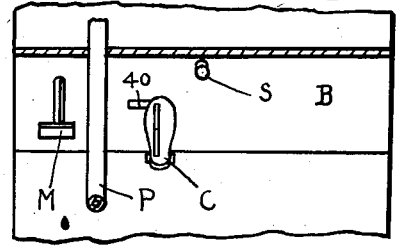
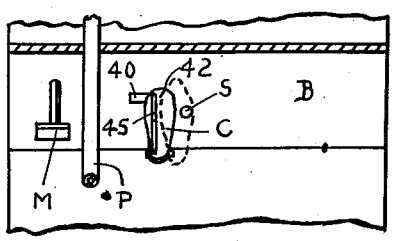
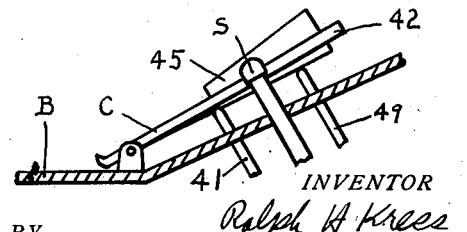
INVENTOR
Ralph H. Kress
BY
Gardner W. Pearson
ATTORNEY Patented Feb. 25, 1941

2,232,790

UNITED STATES PATENT OFFICE 2,232,790

CONTROL ASSEMBLY FOR AUTOMOBILES

Ralph H. Kress, Lawrence, Mass., assignor to Patent Protection Corporation, Lowell, Mass., a corporation of Massachusetts, trustee Application July 31, 1936, Serial No. 93,664

2 Claims. (Cl. 192—.01)

This invention relates to the arrangement of devices for controlling automobiles of the most common type today in which there is an explosive motor connected with the driving wheels by a clutch which can be engaged and disengaged while the motor can be accelerated or decelerated, and there is a standard right foot brake mechanism associated with some or all of the wheels and an emergency brake system which may be associated with some or all of the wheels or may control the engine shaft or the drive shaft or both. There is also a steering wheel, carried by a shaft in a steering post, by which the operator turns the front wheels for guiding the automobile.

Certain of the control devices are now usually arranged in association with a footboard on which the feet of the operator rest. These control devices include a steering post in which is the shaft which passes through the footboard and which carries the steering wheel in easy reach of the hands of the operator, a clutch pedal operated by the left foot at the left of the steering post, a standard right foot brake pedal at the right of the steering post, a gear shift lever operative by the right hand of the operator to shift the gears and a hand brake lever, also operative by the right hand, to use in a sudden emergency or for locking one set of brakes when parked. At the right of the steering post and of the standard brake pedal is also an accelerator button which controls the speed and power of the engine.

Some of the features of this device are disclosed in my patent on Oil pressure automobile clutch control issued December 12, 1933, No. 1,938,914; and applications Serial No. 548,122, filed July 1, 1931, on Clutch control for automobiles, and Serial No. 745,878, filed Sept. 28, 1934, on Rim release oil clutch, which have eventuated in Patent No. 2,087,380 issued July 20, 1937, and Patent No. 2,122,067, issued June 28, 1938, respectively.

The principal novelties are doing away with the clutch pedal operated by the left foot and replacing it with an emergency and parking brake pedal, and of locating the button, pedal or other device for controlling the clutch so close to or associated with the accelerator button that normally the clutch will be disengaged and the engine will either not be running or running idle, but so that when the right foot of the operator presses the associated devices, the clutch will engage and the engine will accelerate.

The hand operable emergency and parking brake lever, operated by the right hand, is replaced by a pedal operated by the left foot in the place now occupied by the clutch pedal. This left foot brake pedal preferably has means for locking in position for parking.

Preferably I use a combination pedal to control the accelerator and a fluid or liquid operable clutch. Ordinarily the accelerator is in the off position, but sufficiently on so that when the motor starts, it will idle and as the foot movement increases, the clutch is engaged and then acceleration starts.

The starting button may be so close to such a pedal that it and the accelerator and clutch may all be operated independently, successively or some of them together, by the right foot and without removing the right foot from the pedal.

In the drawings,

Fig. 1 is a side elevation of an automobile equipped with my devices, parts being broken away to show the operation.

Fig. 2 is a plan view of the footboard with the various controlling devices.

Fig. 3 is a detail side elevation, partly in section, showing an emergency and parking pedal suitable for operation in my device.

Fig. 4 is a detail side elevation, partly in section, of a combined clutch and accelerator pedal of my preferred construction.

Fig. 5 is a plan view of the pedal shown in Fig. 4.

Fig. 6 is a view similar to Fig. 4 with the accelerator and clutch parts both depressed, and Fig. 7 is a similar view showing the accelerator pedal released and the clutch pedal somewhat depressed, while Fig. 8 shows the accelerator part down to its lowest point and the clutch part raised to its highest point.

Fig. 9 is a plan view of Fig. 8.

Fig. 9A is a detail view showing one type of diaphragm and clutch plates.

Fig. 10 is a detail side elevation with parts broken away to show the relation of the various parts with their connections, etc.

Fig. 11 is a plan view of a footboard with a modified arrangement of controls.

Fig. 12 is a plan view showing the footboard and steering post and wheel with another arrangement of controls.

Figs. 13, 15 and 16 are plan views of footboards with still other modified arrangements of controls.

Fig. 14 is a view similar to Fig. 2 showing the details of another arrangement for a brake pedal.

Figs. 15 and 16 are plan views of other arrangements of controls and Fig. 17 is an enlarged right side elevation of the pedal shown in Fig. 16.

In the drawings, A represents an automobile with front wheels K, K controlled by a steering wheel D, carried by a steering shaft F which runs through steering post P, by the usual connections indicated by 9. Rear wheels W, W are connected by the usual axles 71 and differential gears 72 enclosed in a rear housing 73 and are driven by what I will call a clutch shaft 2 from the clutch H in a well-known manner.

The automobile also includes an engine E with a drive shaft 1, which also enters the clutch H, by which it can be connected to or disconnected from the clutch shaft 2.

B is a footboard through which steering shaft F and brake pedal R, of any usual type, both pass. Steering shaft F, as shown, is arranged for control by a rider sitting on the left of the front seat and brake pedal R is at the right of the steering post in position to be operated by the right foot V of the operator. By means of suitable connections, indicated by 20 and 21, brake pedal R controls brakes such as 24 on all four wheels or on both front or both rear wheels only. Brake pedal R and its accompanying connections are returned to the inoperative position as by a spring 25 in the usual manner.

L represents a parking pedal which takes the place of the usual hand operated emergency brake and is located at the left of the steering post in a position to be operated by the left foot T of the operator.

Pedal L is distinctly an emergency and parking brake pedal, and as shown, is pivoted at 13. It has a foot contact member 100 which carries a long pawl 11, both so pivoted at 10 that pawl 11 can engage the teeth of a fixed ratchet 12 when member 10 is depressed by the foot of the operator, to lock the brake for parking. This device is indicated by N.

As shown, it has a returning spring 14 and through a link and bell crank lever operates a brake shoe 16 to engage a drum 17 on clutch shaft 2 in any usual manner. When lever L is pushed down for an emergency stop, it stops shaft 2 and the wheels. When the car is to be parked, brake pedal L is depressed and the foot member 100 and pawl 11 are manipulated by the left foot T so that the parts are locked in place by ratchet 12.

S represents an electric starter button of any well known type which projects through the footboard B. As shown in Fig. 2, the hand brake lever is, therefore, dispensed with but the gear shift lever G can be used in its usual position.

However, as shown in Fig. 11, any of the automatic gear shifting devices, such as those of the centrifugal type, located under the car, can be used to do away with the gear shift lever, or as shown in Fig. 12, a gear shifting control lever 99 in position on the steering wheel X can be used to do away with the gear shift lever.

As shown, the clutch H is of the fluid operable type, either liquid or gas, and includes clutch plates 30 and 31 operable by diaphragm 32, such, for instance, as shown in my U. S. Letters Patent of December 12, 1933, No. 1,938,914.

Fig. 9A shows a detail of this construction in which the diaphragm is 132, the movable clutch plates are 131 and 130 and the other clutch plate is 133. 134 represents a pivoted weight such as R in that patent, 135 a pin such as 28 in that patent and 136 a spring such as 48 in that patent. However, as shown in Fig. 10, the elasticity of a diaphragm 32 can be sufficient to disengage the clutch plates 130 and 131.

The clutch is preferably controlled together with the accelerator from a combination pedal C which extends up through the footboard in position to be operated by the right foot V of the operator and is shown in detail in Figs. 4, 5, 6, 7, 8 and 9.

The fluid, which may be oil, from a pump 33 and tank 34 is controlled by a valve 35 which is operated from a rod 41 connected to a pedal plate 42 pivoted to the footboard B at 43. Through pedal plate 42 is a longitudinal slot 44 which registers with a contact part 45 of an accelerator lever 46 pivoted to the footboard at 47 and operating the carburetor 48 by means of a connecting rod 49.

61 and 62 represent suitable returning springs which together with the pivoted levers make up a combination accelerator and clutch device, the whole of which is so positioned at the right of the steering post as to be operated by the right foot of the operator. These parts are so arranged that the springs normally cause the clutch to disengage, thus disconnecting engine E and drive shaft 1 from the clutch shaft 2. When this combination device C is pressed forward, it first causes the clutch to engage and as it continues, the clutch remains engaged and the engine accelerates, thereby increasing the speed and power of the automobile.

When slowing or stopping, the right foot V is released more or less from the combination device and if entirely released, the engine is completely decelerated, the clutch disengaged and the right foot is then moved to the standard brake pedal R, thereby stopping the car.

40 is a finger which projects from the left of the part 45 of accelerator lever 46 so that, as shown in Figs. 8 and 9, the foot V can be swung over clear of plate 42, whereby the accelerator can be operated without engaging the clutch.

In the drawings, Figs 2, 3, and 4, show the normal or at rest position of the pedals with both the clutch plate 42 and the accelerator lever 46 in the inoperative position. In this position the engine ordinarily would be idling.

In Fig. 6, plate 42 and lever 46 are both down in the position they would occupy with the clutch engaged and the engine running at high speed.

In Figs. 5 and 7, the right foot V is shown as having pushed down the clutch plate 42 without moving the accelerator lever 46, so that the clutch is engaged as it may be in running downhill and with the engine idling or shut off with the compression used for braking.

In Figs. 8 and 9, the right foot V is pressed on the finger 40 thereby depressing the lever 46 while the clutch plate 42 is not pressed and the clutch therefore is not engaged. This allows for warming up of the engine when starting on a cold morning.

If now it is wished to park, the parking or emergency pedal L is pressed and locked. If, on the other hand, a sudden emergency arises where quick action is necessary, the operator can release the right foot and jam on the right foot standard brake pedal R alone or with the left foot can engage the emergency or parking pedal L. If he wishes, he can operate both with the natural action of pushing out with both feet, instead of the unnatural action of reaching forward with the right hand and then pulling back, now necessary with a hand brake.

Various approved combinations of the controls are shown in Figs. 11 to 16. In Fig. 11, the gear shift lever G is omitted, the gear shifting being wholly automatic as in some well-known cars. This leaves the combination emergency and parking pedal L, steering post P, regular brake pedal R, starting button S and combination accelerator and clutch pedal C as constituting the controls.

In Fig. 12 is shown the same combination as in Fig. 11 except that instead of a complete automatic invisible gear shift, there is shown at 99, a well-known type of gear shift range control.

In Figs. 13 and 14 is shown a combination of a regular gear shift lever G, combination clutch and accelerator pedal C, starting button S, but instead of the regular brake pedal R, this is combined at the left of the steering post P in a combination brake pedal M which, as shown in Fig. 14, for normal braking, controls the brakes through the medium of a hydraulic cylinder 50 with piston arm 51, rocking lever 52 and control rod 53 which is moved by an arm 54 on pedal M, the parts being so connected that when pressed way down almost to the footboard B, a rocking lever 55 engages a head 56 on a brake rod 57 which operates mechanical brakes of a well-known type on the rear wheels of the automobile. The locking device N allows the operator to lock the brakes, both the hydraulic and mechanical, in the set position for parking and the construction also permits regular and emergency braking or emergency braking if the regular hydraulic line is out of action, as well as parking. Locking devices N are the same as those shown with pedal L including members 10, 11, 12 and 100 of a slightly different shape.

Fig. 15 shows a combination similar to Fig. 13 except that the gear shift lever is omitted, the starter is in the usual place, the combination pedal C is in place and the combination pedal M is at the left of the steering post.

In Fig. 16, the gear shift lever is omitted and the combination brake pedal M is at the left of the steering post P while the starting button such as S is close to the combination clutch and accelerator pedal C.

Starting button S can be so close to and can project above the pedal plate 42, of the combination pedal C, that the right foot V of the operator can be swung away from the part 45 of the accelerator lever and in pressing down, it will first engage the starting button, starting the motor and permitting it to idle and can then be swung back and pressed down, as shown in Fig. 6, thereby engaging the clutch and continuing to accelerate the motor as much as desired.

I claim:

1. A control device for automobiles including a clutch pedal pivoted to the footboard and having a front to back slot at one side and connections to the control valve of a fluid clutch, and an accelerator pedal which is so pivoted to the footboard, as to register with such slot and has a finger projecting beyond the side of the clutch pedal and connects with and controls the throttle value.

2. A control device for automobiles including a clutch pedal pivoted to the footboard and having a front to back slot and connections to the control valve of a fluid clutch, and an accelerator pedal which is so pivoted to the foot board, as to register with such slot and connects with and controls the throttle valve.

RALPH H. KRESS.